D. HORSLEY.
MOVING PICTURE CAMERA AND VISION PICTURE ATTACHMENT.
APPLICATION FILED AUG. 20, 1914.
1,288,894.
Patented Dec. 24, 1918.
3 SHEETS—SHEET 1.
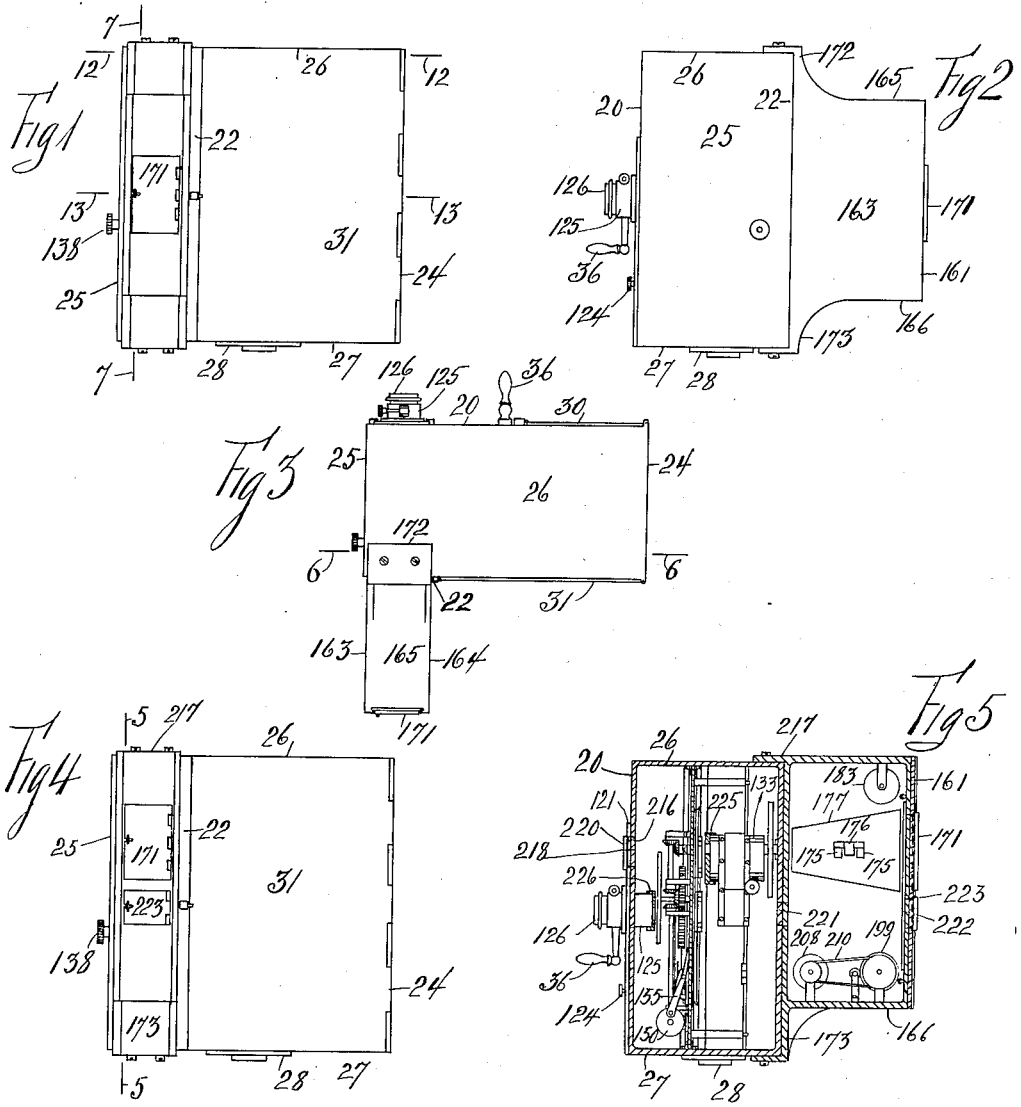
Witnesses:
John Jessich
O. H. Baker
Inventor
David Horsley
By his Attorney
A. A. de Bonneville

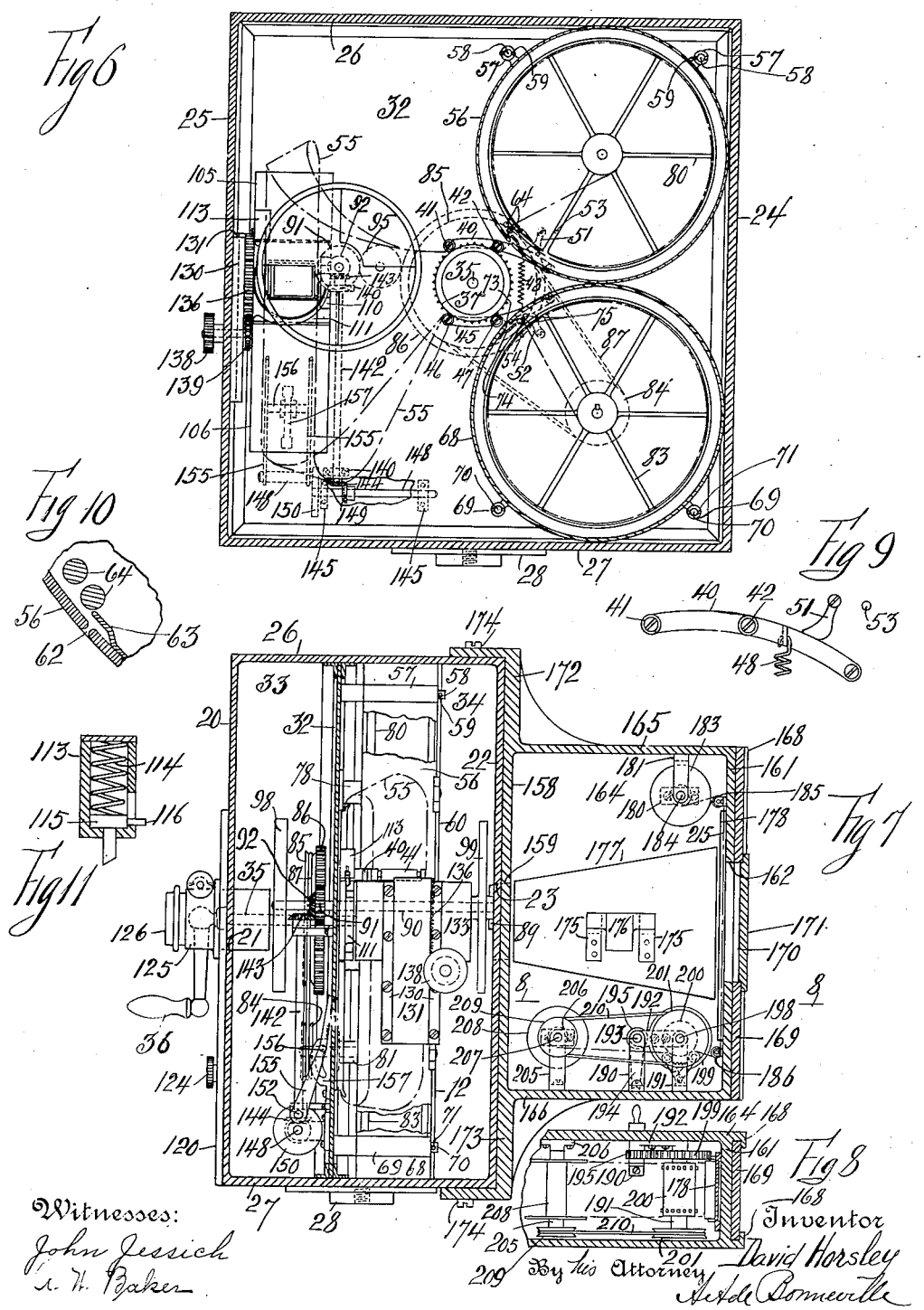

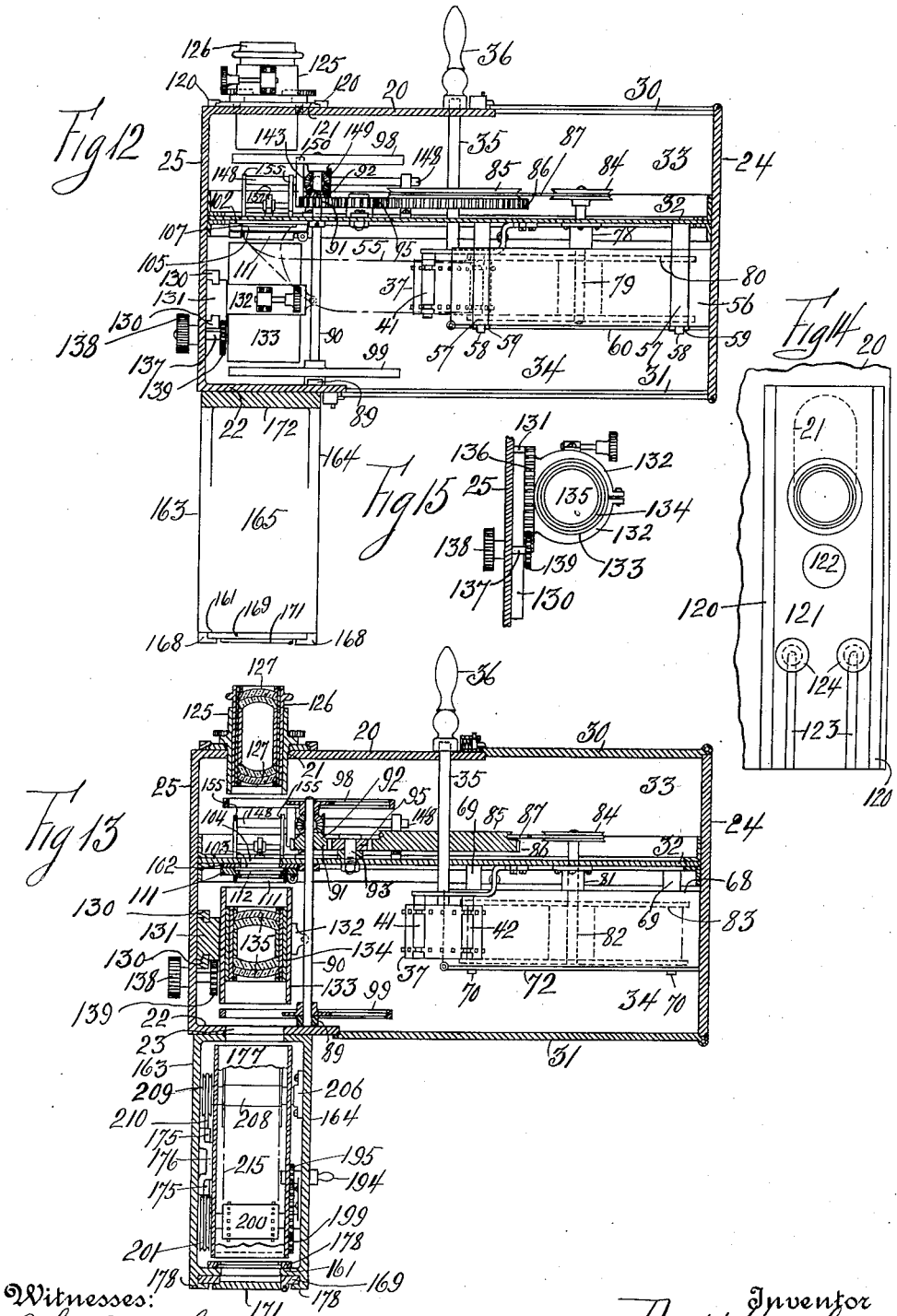

UNITED STATES PATENT OFFICE.

DAVID HORSLEY, OF BAYONNE, NEW JERSEY.

MOVING-PICTURE CAMERA AND VISION-PICTURE ATTACHMENT.

1,288,894. Specification of Letters Patent. Patented Dec. 24, 1918.

Application filed August 20, 1914. Serial No. 857,661.

*To all whom it may concern:*

Be it known that I, DAVID HORSLEY, citizen of the United States, and resident of Bayonne, in the county of Hudson and State of New Jersey, have invented certain new and useful Improvements in Moving-Picture Cameras and Vision-Picture Attachments, of which the following is a specification.

This invention relates to a moving picture camera with a vision picture attachment, so as to be enabled to produce a combination of pictures on a film.

Its organization comprises a camera for photographing moving or stationary objects on a main or emulsion film in conjunction with an attachment for photographing on the film pictures from a picture film or direct from a moving or stationary object. The invention is shown with means to photograph both portions of the combined pictures produced simultaneously on the emulsion film. A modification is also shown by means of which the second picture, usually a vision picture, is photographed on the main film at a different time from the main picture of each combination, or more specifically, two pictures are simultaneously photographed on the main film of the camera which may be distant from each other. In the modification the main picture for a combination is made from an exposure before or after the exposure for the second picture of the combined picture.

One of the essential novelties of this invention enables the photographing on the sensitive or emulsion film from both sides of the camera, either simultaneously or in rapid sequence, and the film has to be propelled only once through the camera to obtain a double impression.

In the drawings Figure 1 represents an elevation exemplifying the invention; Fig. 2 shows a left hand side view of Fig. 1; Fig. 3 represents a top plan view of Fig. 1; Fig. 4 is an elevation of a modification of the invention; Fig. 5 shows a section of Fig. 4 on the line 5, 5 with some of the parts in full; Fig. 6 represents an enlarged section of Fig. 3, on the line 6, 6 with some of the parts in full; Fig. 7 shows an enlarged section of Fig. 1 on the line 7, 7, with some of the parts in full; Fig. 8 is a section of Fig. 7 on the line 8, 8; Fig. 9 shows an enlarged elevation of some details; Fig. 10 represents a fragmentary portion of Fig. 6; Fig. 11 is an enlarged sectional view of a detail; Fig. 12 shows a section of Fig. 1 on the line 12, 12; Fig. 13 represents a section of Fig. 1 on the line 13, 13. with some of the parts in full; Fig. 14 shows an enlarged elevation of details, and Fig. 15 represents some details.

The camera is represented with the casing comprising the front wall 20, with the elongated opening 21, the rear wall 22 with the opening 23, the side walls 24, 25, top wall 26 and bottom wall 27. A threaded bracket 28 is fastened to the bottom wall 27. A door 30 is hinged over a large opening in the wall 20, and a door 31 is hinged over a large opening in the wall 22. A partition wall 32 divides the casing into two chambers 33 and 34.

A driving shaft 35 with the handle 36 is journaled in the wall 20 and partition wall 32. A sprocket drum 37 is fastened to the shaft 35. An upper tension roller bracket 40 is pivoted to the partition wall 32, and has pivoted thereon the film tension rollers 41, 42. A bottom tension roller bracket 45 is pivoted to the partition wall 32, and has pivoted thereto the tension rollers 46 and 47.

A spring 48 has its ends connected to the said tension brackets. Locking fingers 51, 52 are pivoted to the partition wall 32 for said tension brackets. Pins 53, 54 extend from the partition wall 32 and respectively support the fingers 51 and 52 when the latter are not engaged with the brackets 40 and 45. The said brackets maintain the unexposed main or emulsion film 55 in proper position on the sprocket drum 37.

A discharging film magazine 56 in the upper portion of the chamber 34 has extending therefrom supporting brackets 57 that engage pins 58 extending from the partition wall 32. Pins 59 extend through openings in the ends of the pins 58 to maintain the magazine in proper position. A side door 60 is hinged to the magazine 56. In the wall of the magazine is formed an opening 62 and a light shield 63 extends over said opening. A pair of guide rollers 64 are journaled in the magazine adjacent to said opening.

A receiving film magazine 68 in the lower portion of the chamber 34 has extending therefrom the supporting brackets 69 that engage pins 70 extending from the partition wall 32. Pins 71 extend through openings in the ends of the pins 71 to maintain the magazine 68 in proper position. A side door 72 is hinged to the magazine 68. In the wall of the magazine 68 is formed an opening 73 and a light shield 74 extends over said opening. A pair of guide rollers 75 are journaled in the latter magazine adjacent to the opening 73 therein.

A bracket 78 with the journal pin 79 is fastened to the partition wall 32. The pin 79 extends into the magazine 56, and has journaled thereon the film reel 80.

A journal bearing 81 is fastened to the partition wall 32, and has journaled therein the shaft 82 which extends into the film magazine 68. A film reel 83 is detachably fastened on the end of the shaft 82 that extends into the magazine 68.

On the other end of the shaft 82 is fastened the grooved pulley 84.

A combined grooved pulley and gear designed at 85 and 86 is fastened to the driving shaft 35, and a belt 87 connects the pulley 85 with the pulley 84.

A journal bracket 89 is fastened to the wall 22, and a shutter shaft 90 is journaled in said bracket and in the partition wall 32. A combined spur and bevel gear indicated at 91, 92 is fastened to the shaft 90. A pivot 93 is fastened to the partition wall 32, and has journaled thereon the intermediate gear 95. The gear 91 meshes with the gear 95, and the latter meshes with the gear 86. Shutters 98 and 99 are fastened to the shutter shaft 90, the shutter 98 being located in the chamber 33 and the shutter 99 in the chamber 34.

A guide plate 102 with an opening 103 is fastened to the partition wall 32, the opening 103 registering with an opening 104 in said wall. A pair of superimposed guide plates 105 and 106 are fastened to the plate 102, and are shouldered at 107 to enable the film 55 to move past the opening 103.

A hinge bracket 110 is fastened to the plate 102, and has hinged thereto the gate 111 with the opening 112. A spring latch with the casing 113, spring 114, latch 115 having the handle 116 is fastened to the plate 102 to lock the gate 111 in operative position.

On opposite sides of the elongated opening 21 in the wall 20 are formed the guides 120. A lens holder plate 121 with the opening 122 is engaged by said guides. A pair of slots 123 are formed in the plate 121. A pair of screws 124 in threaded engagement with the wall 20 pass through the slots 123 and enable the plate 121 to be clamped in different positions. A lens casing 125 is in threaded engagement with the plate 121. The casing contains an adjustable lens barrel 126 with the lenses 127. The lens casing 125 extends through the elongated opening 21 of the wall 20 into the chamber 33.

A pair of guides 130 are secured to the wall 25 and guide the slide bracket 131 which has formed therewith the supporting members 132 for the lens casing 133. The latter casing contains the adjustable lens barrel 134 with the lenses 135.

A rack 136 is formed with the slide bracket 131. A spindle 137 with head 138 is journaled in the wall 25. A pinion 139 on the spindle 137 meshes with the rack 136. A pair of journal brackets 140 extend from the partition wall 32 and have journaled therein the vertical shaft 142. A bevel gear 143 fastened to the upper end of the shaft 142 meshes with the bevel gear 92. A bevel gear 144 is fastened to the lower end of the vertical shaft 142. A pair of brackets 145 extend from the partition wall 32 in the chamber 33 and have journaled therein the horizontal shaft 148. A bevel gear 149 on the shaft 148 meshes with the bevel gear 144. A disk 150 is fastened to the shaft 148 and has extending therefrom the crank pin 152.

On the crank pin 152 is hinged one end each of a pair of film gripping fingers 155 that are positioned to engage the perforations in the film 55. A cross bar 156 extends between the fingers 155. A grooved cam 157 is fastened to the partition wall 32 and the cross bar 156 rides therein.

A vision attachment is represented with a casing comprising the front wall 158 with the opening 159, rear wall 161 with the opening 162, side walls 163, 164, top wall 165 and bottom wall 166. From the rear wall 161 and on opposite sides of the opening 162 are formed guides 168 for the slide 169 having the opening 170. A gate 171 is hinged over the opening 170.

A bracket 172 extends from the top wall 165 and a bracket 173 extends from the bottom wall 165, to clamp the attachment to the casing of the camera by means of screws 174. A pair of brackets 175 extend from the side wall 163 and carry the bracket 176 to which is attached the tapered light duct 177.

A film guide plate 178 with the opening 179 is fastened to the wall 161. A journal bracket 180 extends from the wall 164 and a second journal bracket 181 extends from the top wall 165. A film spool 183 is shown with the shaft axle 184 which latter is journaled in the brackets 180 and 181. A pair of guide rollers 185 and 186 are journaled in brackets that extend from the wall 161. Journal brackets 190 and 191 extend up from the bottom wall 166. A brace 192 is fastened to the wall 164 and has journal bearings that are axially in line with the bearings of the brackets 190 and 191. A driving shaft 193 with the handle 194 is journaled in the bracket 190 and brace 192. A pinion 195 is fastened to the driving shaft 193. A shaft 198 is journaled in the bracket 191 and the brace 192, and has fastened thereto the spur gear 199 that meshes with the pinion 195. A sprocket drum 200 and grooved pulley 201 are fastened to the shaft 198. A bracket 205 extends up from the bottom wall 166 and a bracket 206 extends from the side wall 164. A shaft 207 is journaled in the latter brackets and carries the film spool 208 and grooved pulley 209. A band 210 connects the pulley 209 with the pulley 201. A picture film 215 with the vision pictures thereon is carried from the spool 183 to the spool 208.

To use the invention shown in Figs. 1 to 3 and 6 to 15 the operator first focuses the lenses 135 and 127. To focus the lenses 135, the lenses 127 must be moved out of the level of the said lenses 135. The operator unscrews the screws 124, then moves up the holder 121, until the opening 122 is located in the axial center of the lens casing 133 and the openings 23 and 162. In this position of the holder 121 the lenses 135 can be focused.

To focus the lenses 127, the operator first moves down the lens casing 133 by turning the knurled head 138, to locate the lenses 135 below the opening 23. Then the axial line of the lenses 127 are brought in line with the center of the opening 23 and said lenses 127 are focused. The lenses 135 are then brought up to their normal position to locate them in alinement with the lenses 127. The film 55 is next moved through the camera by turning the handle 36 in the usual manner. The picture on the film 215 is allowed to remain for as many pictures of the film 55 as required. The rays of light enter the opening 162 and pass through the vision film 215, photographing the pictures of said film on the film 55. If another vision picture of the film is to be photographed on the film 55, the handle 194 is turned to locate it in proper position.

In the modification of the invention shown in Figs. 4 and 5, the elements in the moving picture camera are the same as already described with the exception that the normal position of the lens casing 133 and its appurtenances is above the lens casing 125. The vision attachment in the modification is somewhat different in shape from that already described, and instead of the bracket 172, the casing of the modification has formed therewith the lug 217, while the bracket 173 remains the same. The elements in the vision attachment are essentially the same as described, but the tapered light duct 177 is elevated to be in line with the normal position of the lens casing 133. Instead of the elongated opening 21 in the camera, it is made cylindrical for the lens casing 125. The lens holder plate 121 has formed therein an opening 216 axially in line with a similar opening 218 in the wall 20 of the camera casing, and both of said openings are axially in line with the casing 133. A door 220 is hinged to the plate 121 over the opening 216. An opening 221 is formed in the wall 22 axially in line with the lens casing 125. An opening 222 with the door 223 is formed in the wall 161, and is axially in line with the opening 221. To focus the lenses of this modified form of the invention the operator opens the door 220 to focus the lenses in the casing 133, and opens the door 223 to focus the lenses in the casing 125. Otherwise the mode of operation is the same, except that when the vision picture is photographed on the film 55 a hood 225 is placed on the lens casing 133 to prevent the light rays exposing the film 55, where it is not used for the vision picture. A hood 226 is also placed on the lens casing 125 for a similar purpose.

Both forms of the invention may be modified by omitting the film 215 in the vision attachment and exposing the main film 55 to an object either moving or stationary, outside of the vision attachment and through the light duct 177, or in both, the vision attachment may be detached from the camera casing.

With the invention a film is enabled to have objects photographed thereon that are located on its opposite sides.

Having described my invention what I desire to secure by Letters Patent and claim is:

1. In an apparatus the combination of a camera, two lenses in the camera, a lens casing for each lens, the lenses normally having their axes coincident and photographing a picture from opposite sides of the camera on an emulsion film in the camera, and means to vary the level of each lens casing and thereby its lens, to locate one lens out of the axial center of the other, so that either lens can be focused without interference from the other.

2. In an apparatus the combination of a camera, two lenses in the camera, a lens casing for each lens, the lenses normally having their axes coincident, an emulsion film in the camera located so that both lenses can simultaneously coact therewith, means to vary the levels of each lens casing and thereby enable each lens to be focused without interference from the other, a picture film in the camera in addition to the emulsion film, and means to locate the picture film in different positions, one of the lenses enabled to photograph a picture from the outside of the camera on the emulsion film, and the other lens simultaneously photographing a picture from the picture film on said emulsion film.

3. In an apparatus of the character described, the combination of a camera, a casing for the camera, a lens holder plate slidably connected to said casing and over an elongated opening in said casing, a lens casing with lenses connected to said plate, the lens casing extending into the casing of the camera through said elongated opening, a slide bracket movably connected to an inner surface of the casing of the camera, a rack formed with the slide bracket, a spindle pivoted through the casing of the camera, a pinion on said spindle meshing with said rack, a second lens casing with lenses connected to the slide bracket, a partition wall in the casing having an opening, means to guide a picture film past the opening in said partition wall, means to pull said film past the opening in said partition wall, a discharging film magazine in the casing of the camera, a sprocket drum journaled in the camera for said film, a receiving film magazine in the casing, a film reel in each magazine, a connection between the reel in the receiving film magazine and the sprocket drum, and an attachment with openings connected to the camera, all of the openings and lens casings normally axially registering with each other, and a picture film in the attachment extending across one of its openings and movable relatively thereto.

4. In an apparatus of the character described, the combination of a camera, a casing for the camera having openings for a pair of lens casings, lenses for each lens casing, means to enable a picture film to coact with the lenses in both lens casings, a vision picture attachment for the camera having openings to enable light to pass through, said openings registering with the openings of the camera and with both lens casings, a light duct in said attachment, a film guide plate in said attachment, a pair of film spools in said attachment for a second film, to move it across the openings of said attachment, the coaction of the elements enabling a series of pictures to be photographed on the main film of objects outside of the camera, and also to photograph pictures from the second film on the main film.

Signed at Bayonne, in the county of Hudson and State of New Jersey, this 6th day of August, A. D. 1914.

DAVID HORSLEY.

Witnesses:
 MASON B. SPOFFORD,
 W. G. GILMOUR.